(12) United States Patent
Bernard

(10) Patent No.: US 6,572,055 B1
(45) Date of Patent: Jun. 3, 2003

(54) HYDROSTATIC SIDESTICK COUPLING

(75) Inventor: Guy Bernard, Kirkland (CA)

(73) Assignee: Bombardier Aerospace Corporation, Hartford, CT (US)

( * ) Notice: Subject to any disclaimer, the term of this patent is extended or adjusted under 35 U.S.C. 154(b) by 0 days.

(21) Appl. No.: 09/616,479

(22) Filed: Jul. 14, 2000

Related U.S. Application Data

(60) Provisional application No. 60/148,134, filed on Aug. 10, 1999.

(51) Int. Cl.[7] ............................................. B64C 13/12
(52) U.S. Cl. ....................................... 244/229; 244/234
(58) Field of Search ................................ 244/229, 235, 244/234, 226, 220; 60/571; 114/150, 171

(56) References Cited

U.S. PATENT DOCUMENTS

| | | | |
|---|---|---|---|
| 404,472 A | * | 6/1889 | Dunn |
| 1,431,244 A | * | 10/1922 | Mendel |
| 1,935,004 A | * | 11/1933 | Winther |
| 2,608,060 A | * | 8/1952 | Smith |
| 3,286,958 A | | 11/1966 | Moran .......................... 244/84 |
| 3,604,664 A | | 9/1971 | Mahoney ...................... 244/84 |
| 4,004,537 A | | 1/1977 | Nilsson .................. 114/144 R |
| 4,470,570 A | | 9/1984 | Sakurai et al. ............... 244/235 |
| 4,472,780 A | | 9/1984 | Chenoweth et al. ........ 364/434 |
| 4,598,890 A | | 7/1986 | Herzog et al. .............. 244/230 |
| 4,649,484 A | | 3/1987 | Herzog et al. .............. 364/424 |
| 5,002,241 A | | 3/1991 | Tizac ......................... 244/237 |
| 5,125,602 A | | 6/1992 | Vauvelle ...................... 244/223 |
| 5,137,234 A | | 8/1992 | Sakurai ........................ 244/234 |
| 5,149,023 A | | 9/1992 | Sakurai et al. ............... 244/229 |
| 5,156,363 A | | 10/1992 | Cizewski et al. ............ 244/223 |
| 5,291,113 A | | 3/1994 | Hegg et al. .................. 318/584 |
| 5,404,305 A | | 4/1995 | Stiles, Jr. ..................... 364/434 |
| 5,456,428 A | | 10/1995 | Hegg ........................... 244/229 |
| 5,493,497 A | | 2/1996 | Buus ........................... 364/434 |
| 5,522,568 A | | 6/1996 | Kamen et al. ............ 244/17.13 |
| 5,694,014 A | | 12/1997 | Hegg et al. .................. 318/564 |
| 5,791,596 A | | 8/1998 | Gautier et al. ............ 244/76 R |
| 5,797,564 A | | 8/1998 | Cartmell et al. ............ 244/223 |
| 5,868,359 A | | 2/1999 | Cartmell et al. ............ 244/223 |
| 5,900,710 A | | 5/1999 | Gautier et al. .............. 318/675 |
| 6,000,662 A | * | 12/1999 | Todeschi et al. |

FOREIGN PATENT DOCUMENTS

| | | |
|---|---|---|
| CH | 223127 | 8/1942 |
| FR | 748.649 | 7/1933 |
| WO | WO85/00148 | 1/1985 |

\* cited by examiner

Primary Examiner—Tien Dinh

(57) ABSTRACT

In a system for directing the motion of a vehicle, controllers, each of which independently controls motion of the vehicle, are linked to a coupling assembly to cause the controllers to experience substantially identical motion. The coupling assembly includes one or more fluid displacers that are linked to a first vehicle controller which force fluid from a first chamber, through a conduit, into a second chamber and against one or more fluid displacers that are linked to a second vehicle controller. The coupling assembly may be used to control motion of the aircraft in multiple degrees of freedom.

28 Claims, 12 Drawing Sheets

HYDROSTATIC SIDESTICK COUPLING

CROSS REFERENCE TO RELATED APPLICATION

This claims the benefit of United States Provisional Patent Application No. 60/148,134, filed Aug. 10, 1999.

BACKGROUND OF THE INVENTION

This invention relates to a system for coupling independently operable vehicle controllers, and more particularly to a system for linking pilot and co-pilot control inceptors in an aircraft. Coupling these sidesticks according to the invention enables them to experience substantially identical motion.

During the flight of an aircraft, actions of the pilot and co-pilot are conveyed to an aircraft flight control system which interprets them and executes them by moving the various control surfaces on the aircraft. More specifically, the pilot-and co-pilot maneuver sidestick controllers (also known by those skilled in the art as "control inceptors") in the cockpit that are directly or indirectly linked to the various aircraft control surfaces. In a mechanical flight control system, the sidesticks can be linked to the control surfaces via, cables and linkages. Such a system is disclosed in U.S. Pat. No. 5,456,428 to Hegg issued Oct. 10, 1995, the contents of which are hereby incorporated by reference in their entirety. In an electronically controlled aircraft, commonly known as a "fly-by-wire" aircraft, sidestick motion is transformed into electrical signals which are typically transmitted to the control surfaces via servomotors, actuators or similar devices. An example of a fly-by-wire control system is disclosed in U.S. Patent No. 4,472,780 to Chenoweth et al. issued Sep. 18, 1984, the contents of which are hereby incorporated by reference in their entirety.

Controlling an aircraft using electronic rather than mechanical flight controls allows the commands that are executed in the cockpit to be augmented by additional inputs from flight control computers, and thereby allows for more efficient aircraft operation.

Presently available civil fly-by-wire aircraft control the aircraft using independently operable pilot and co-pilot sidesticks. There are significant operational and safety benefits of connecting these sidesticks to cause each to move in a pattern that is substantially identical to that of the other. One benefit of linking the sidesticks is to increase the level of safety by providing increased situational awareness for the pilots. That is, the pilot and co-pilot will each be able to closely monitor what the other is doing. Thus, in the event that one of them improperly directs the aircraft (i.e. due to a sudden illness) the other will immediately recognize the error and be able to correct it. Linking the two sidesticks is also beneficial for pilot training.

Sidesticks and other control inceptors are typically designed to operate at very light force gradients and small displacements. These factors place very stringent requirements on the quality of the coupling between the sidesticks. Inability to meet these requirements will adversely effect overall pilot feel. Arrangements for coupling pilot and co-pilot sidesticks are known. However, these known systems have significant limitations. For example, a mechanically controlled system may be limited by:

Hysteresis, friction: inherent to all mechanical transmissions and have a detrimental effect on system performance. However, in sidesticks, they represent a larger contribution with respect to basic operating feel forces and therefore present an increased design challenge because such small forces and displacements are involved. The significant friction forces that can exist between the moving parts often make it difficult for the pilots to precisely move the sidestick and achieve smooth control of the aircraft. Moreover, backlash, which results when the connections that join moving parts are too loose, can also jeopardize the pilot's ability to maintain precise control of the aircraft;

Jam potential: also inherent to all mechanical transmissions and has a detrimental effect on the safety of the aircraft.

Wear: also inherent to all mechanical transmissions. Wear leads to performance degradation over time and adversely impacts the ability to maintain the system.

Installation: Mechanical transmissions have tight tolerances to ensure adequate performance. This typically requires careful and lengthy manufacturing, installation, and rigging.

Weight, inertia: Weight is a critical parameter in aircraft design. For a given distance between the sidesticks, the mechanical coupling will tend to be comparatively heavier than other forms of coupling. The resulting inertia will adversely affect pilot feel and the resulting aircraft handling qualities.

Electronically controlled coupling systems are also somewhat limited. First, electrical servomotors have significant authority, torque, and rate requirements because they are designed to provide maximum feel forces and to accommodate pilot/co-pilot contention, which occurs when the two pilots are simultaneously applying opposite force input commands to their sidesticks. In such a case, the servomotors must generate resistance forces on each of the two sidesticks. These resistance forces simulate sidesticks that typically would be rigidly coupled up to an acceptable level of force fight, and hence provide awareness that contention is taking place. These forces must be fairly large and need to be generated rapidly in order to provide adequate notice to the pilots.

Moreover, servo driven control systems are typically subject to active failure modes. For example, runaway (drift of the sidestick when the motor malfunctions), hardover (maximum drift of the sidestick when a motor fails), and uncommanded motion, can all produce catastrophic results. Servo driven control systems therefore, require high integrity to minimize the occurrence of such failure modes, and to safely and quickly cope with them. These systems also require complex electronic force fight management, and tight loop closure (i.e. high gain, bandwidth, sampling rate, feedback accuracy) in order to provide the required force level and coupling stiffness as well as the quick reaction time required for fault identification and system reconfiguration in the case of a failure. The need to satisfy these requirements results in very complex solutions and generates significant costs.

It would be desirable to be able to provide a device that allows the motion of each sidestick controller to efficiently and accurately follow that of the other.

It would also be desirable to provide a coupling system that avoids active failure modes.

It would also be desirable to provide a sidestick coupling device which is easy to install.

It would also be desirable to provide a sidestick coupling device which minimizes jamming, wear, hysteresis friction and mass inertia.

SUMMARY OF THE INVENTION

In accordance with the present invention, there is provided a system for coupling multiple control inceptors, each of which directly controls the motion of a vehicle. The system includes multiple controllers, each of which independently directs the motion of the vehicle, and a coupling assembly associated with at least two of the controllers. The coupling assembly varies a fluid distribution to cause the controllers to have substantially identical motion.

In a particularly preferred embodiment, the coupling assembly may connect both the pitch and roll degrees of freedom of two sidestick controllers. For one degree of freedom this embodiment includes two chambers placed on opposite sides of each of the controllers. A fluid displacer in each of the chambers is linked to its associated controller. The two chambers associated with each sidestick are connected to the two corresponding chambers that are associated with the other sidestick via two conduits. Each pair of chambers and the conduit that connects them are sealed and substantially filled with fluid. Fluid is transported between the connected chambers in response to motion of the fluid displacers. The same configuration and operating principle applies to the second sidestick axis.

The present invention may be constructed to control motion about one, two or more than two axes of motion. It may also be used to couple more than two controllers. dr

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which.

DETAILED DESCRIPTION OF THE INVENTION

Figure 1:
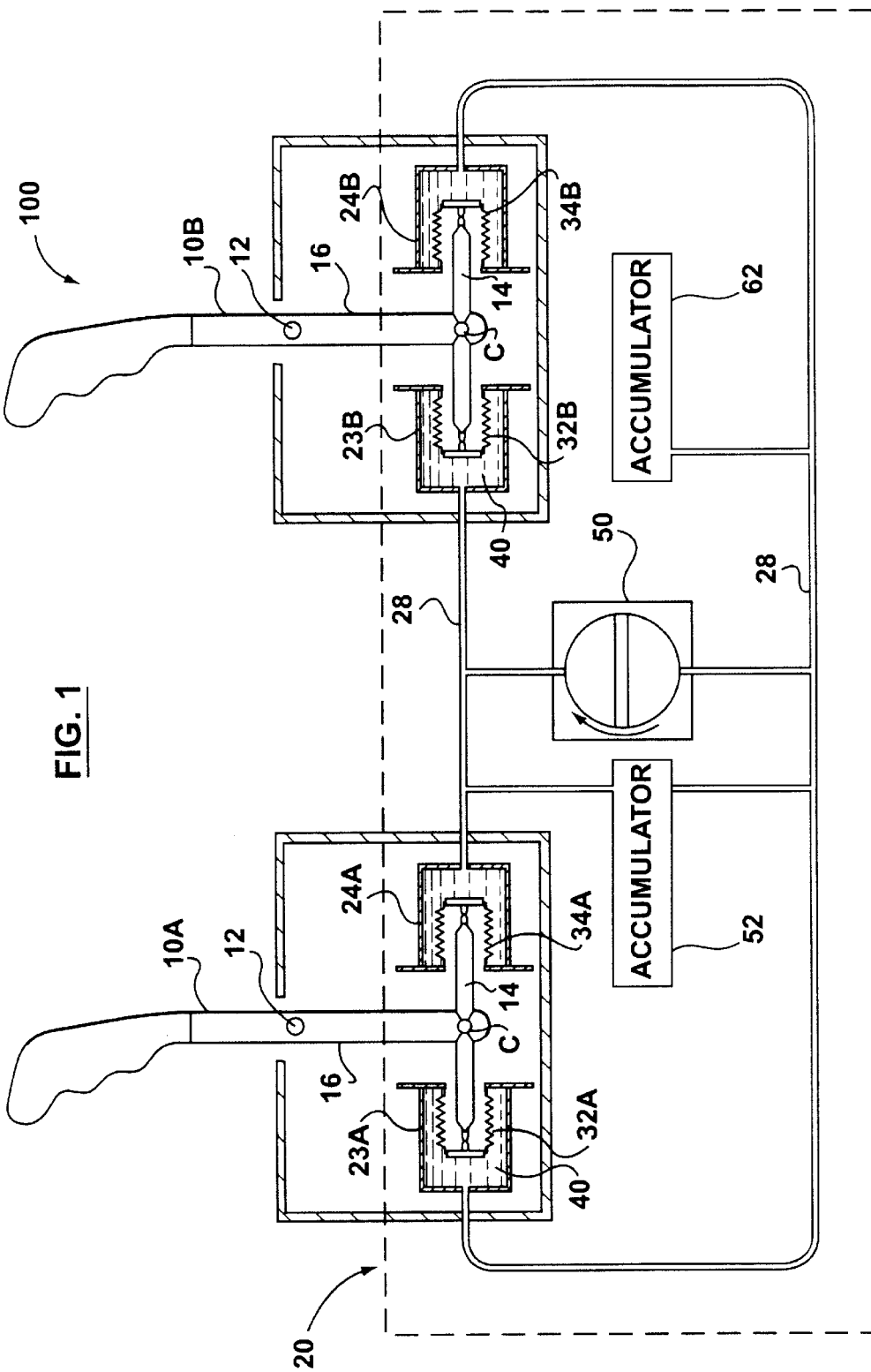
FIG. 1 is a schematic representation of coupling of two single degree of freedom controllers according to one embodiment of the invention.

Referring now to the drawings where examples are provided for the purpose of illustration and not by way of limitation, FIG. 1 shows the preferred embodiment of the present invention, a system 20 for causing substantially identical motion of multiple motion controllers. The invention can be used, for example, to connect one or more degrees of freedom of two or more aircraft control inceptors. The illustrative aircraft control system 20 includes multiple sidesticks 10A and 10B connected to coupling assembly; 20 via levers 16 and links 14. Each sidestick is linked to at least one fluid displacer 32A, 34A, 32B or 34B inside a fluid-containing chamber 23A, 23B, 24A or 24B. The chambers associated with each sidestick are connected to corresponding chambers that are associated with another sidestick via conduits 28. Each connected pair of chambers and conduit assembly is preferably sealed and substantially, if not entirely, filled with fluid.

Fluid displacers 32A, 34A, 32B and 34B translate in response to motion of sidesticks 10A and 10B, or in response to translation of a fluid displacer in a corresponding chamber. For example, motion of sidestick 10A results in translation of fluid displacers 32A and 34A inside chambers 23A and 24A respectively. This fluid displacer motion causes fluid 40 to flow from chambers 23A and 24A to connected chambers 23B and 24B to cause translation of fluid displacers 32B and 34B. Translation of fluid displacers 32B and 34B causes sidestick 10B to move in the same direction as sidestick 10A. In addition to having motion in the same direction, sidesticks 10A and 10B are displaced by substantially the same amount. The fluid displacers that are located on the opposing ends of each conduit should be of similar configuration and have identical effective areas in order to produce identical sidestick motion.

In the preferred embodiment of the invention, fluid displacer is a bellows—preferably a metal bellows. The use of a bellows is preferred because it inherently minimizes both friction and leakage. The metallic material of a metal bellows provides the level of radial stiffness that is necessary to sustain the relatively high fluid pressure levels without changing the fluid displacer diameter. Sustaining the high fluid pressure is necessary to achieve identical motion of the two sidesticks, and to maintain coupling rigidity in case of contention.

In the preferred embodiment of the invention, fluid 40 should be air free, have a high bulk modulus, have low viscosity, exhibit minimal variation in viscosity in response to temperature changes, and have a low coefficient of thermal expansion. As used herein, the term "hydrostatics" refers to the branch of hydraulics that deals with the pressure, equilibrium characteristics and various phenomena of fluids that are not in motion. A "hydrostatic" fluid is incompressible and static. It is preferably also at low pressure. In the preferred embodiment of the invention, fluid 40 is hydrostatic. One advantage gained by using a low pressure fluid is to optimize the life cycle of fluid displacers 32A, 32B, 34A and 34B. It should be noted that the system could operate at any pressure level that is compatible with the strength of the chambers, fluid displacers and conduits.

In the preferred embodiment of the invention, two opposing coupling assemblies are arranged on each sidestick 10A and 10B for each degree of freedom to produce a "closed loop" configuration as shown in FIG. 1. The coupling assemblies are preferably identical. Using such an arrangement sidestick position will not be affected by volumetric variations that result from temperature changes. In addition, each coupling assembly works in compression, thereby preventing the dissolved air from coming out of solution and reducing the effective stiffness of the coupling. Also, the presence of two coupling assemblies per degree of freedom provides redundancy, and thus continued operation, in the event of the failure of one of the coupling assemblies.

The embodiment of aircraft control system 100 provided in FIG. 1 includes a pair of sidestick controllers 10A and 10B, each of which independently controls motion of the aircraft. As those skilled in the art will appreciate, "sidestick controllers" are merely one type of control inceptors. Levers, center sticks, sidesticks, columns, wheels and other similar devices are other types of control inceptors that may also be used to control motion of an aircraft. While the term sidestick controller will be used most often, it is not intended to limit the invention with sidestick control inceptors.

An aircraft could be controlled by one operator using either sidestick controller 10A or 10B. Most often, a primary operator or pilot will be present to operate one of the controllers, and a secondary operator or co-pilot will be present to assist the primary operator or to serve as a backup. The end of each sidestick 10A and 10B is attached to a separate pivot 12, and each pivot 12 is connected to a separate lever 16. Levers 16 are attached to links 14 at points C. Links 14 are connected to a coupling assembly 20. While the embodiment of the invention illustrated here includes links 14 and levers 16, it should be noted that any other device which may connect coupling assembly 20 to controllers 10A and 10B may be used with the invention.

Those skilled in the art will recognize that the coupling system can be altered to include a de-coupling mechanism that can be operated to enable continued operation of one sidestick in the event that a corresponding sidestick jams. This capability is especially useful in aircraft applications, where a simultaneous jam of both sidesticks would be catastrophic. For example, if a jam occurs, valve 50 could be opened to link the two conduits 28, and provide a path that allows for free circulation of the fluid in the operable sidestick.

The system of FIG. 1 would typically control motion about one axis of the aircraft. While such a system could be employed, the invention is not limited to controlling a single degree of freedom of motion, and in at least the preferred embodiment of the invention, the aircraft operators may control motion of the aircraft in multiple degrees of freedom. It should also be noted that while the invention is described here in conjunction with a system that controls an aircraft, it could be used to control other types of vehicles, or with non-vehicle systems that would benefit by having substantially identical motion of independently moveable parts. The invention could also be used to couple one sidestick to a simulator, monitoring device or other apparatus which may be used to track its motion. Finally, while two sidesticks 10A and 10B are shown in the illustration, those skilled in the art will appreciate that the invention could be adapted for use in a system that includes three or more sidesticks.

Figure 2:
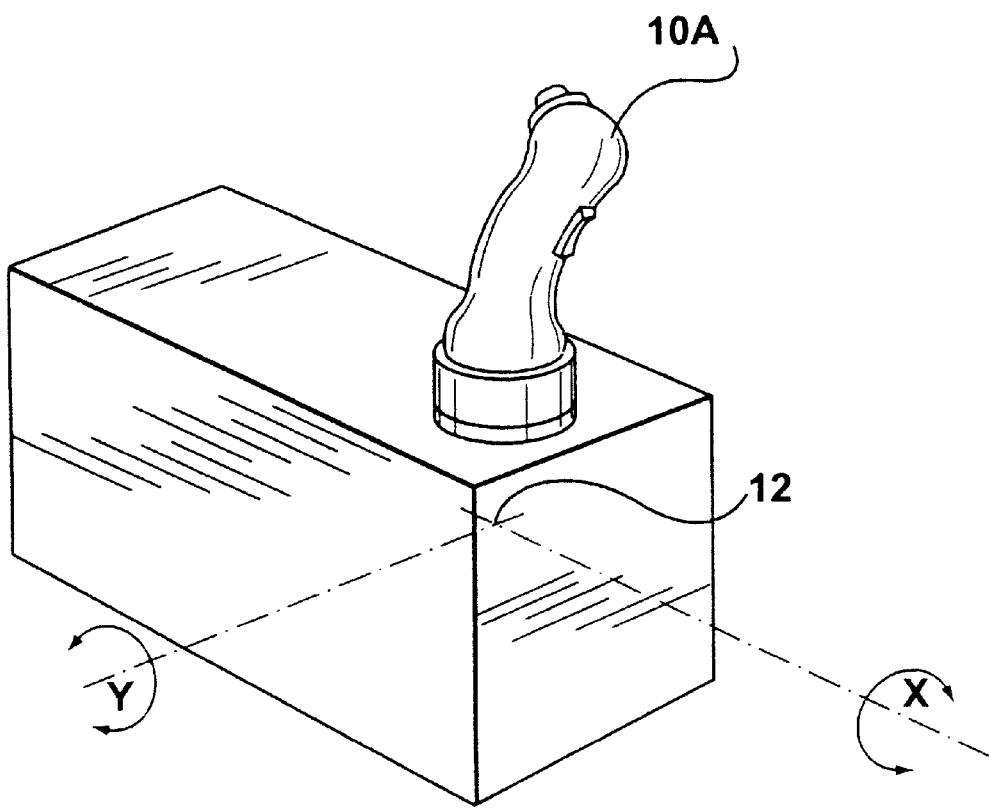
FIG. 2 is a schematic illustration of a sidestick controller that may be used with the present invention, placed in the coordinate system used to describe the invention.
Figure 3:
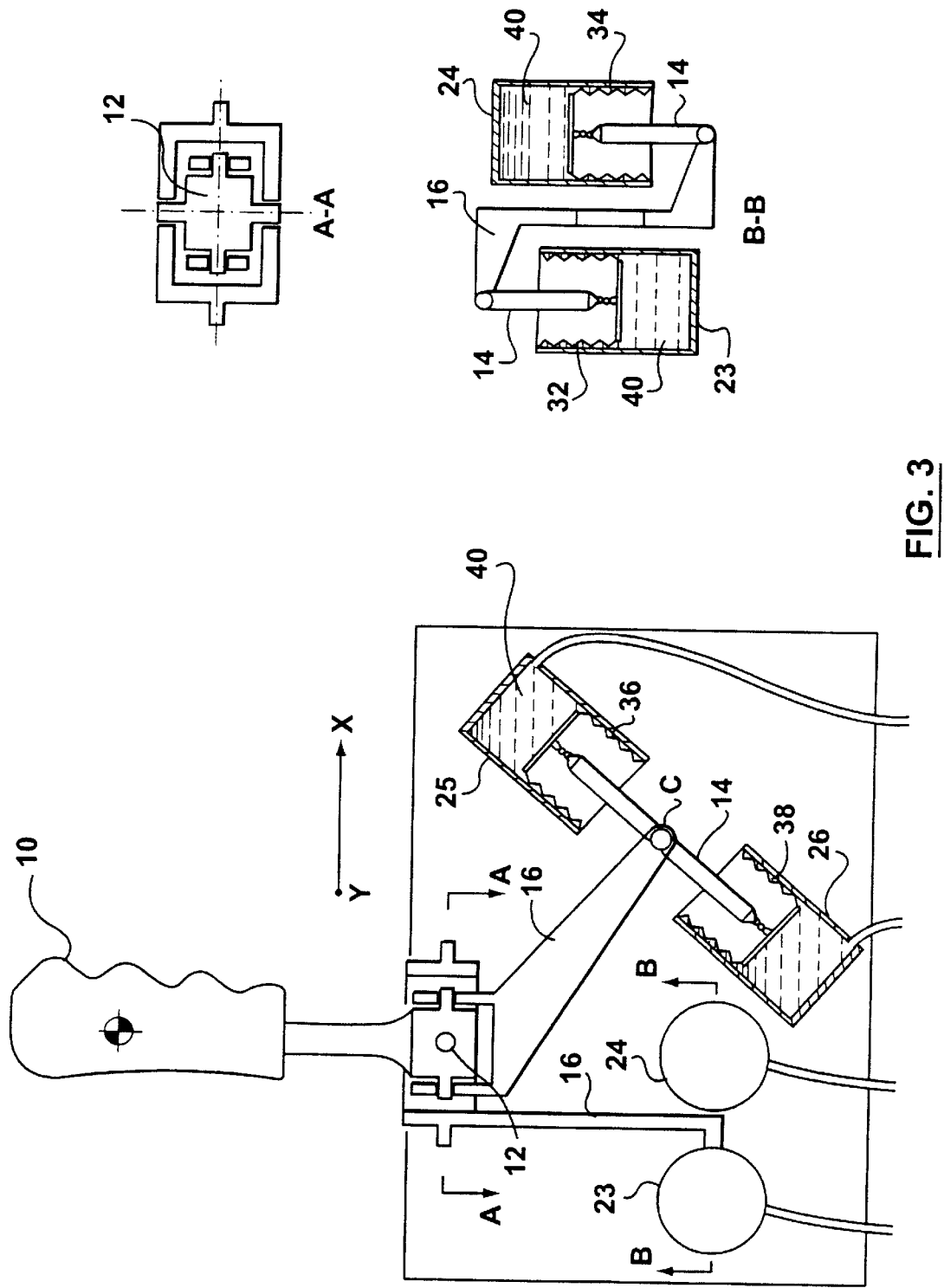
FIG. 3 is a detailed view of an exemplary embodiment of the invention for dual axis sidestick controllers.

Turning now to FIGS. 2 and 3 when the invention is embodied in an aircraft, the pilot and co-pilot operate the flight control system by pivoting sidesticks 10A and 10B in the appropriate direction about pivot 12. For example, pivoting the sidesticks about the X axis may control the roll of the aircraft, while pivoting about the Y axis would control pitch. It should be noted that motion of sidesticks 10A and 10B is not limited to pivoting about only one of either the roll (X) or pitch (Y) axes. The sidesticks will preferably rotate in any direction—about an axis that lies at an angle to the pitch and roll axes, in a circular pattern, or in any other manner that may be used to control aircraft flight. The forces that are applied to the sidesticks will determine their position. The flight control system will cause the corresponding motion of the aerodynamic surfaces on the aircraft wings and/or tail to navigate the aircraft. FIG. 3 illustrates an embodiment of the invention that has the pitch axis motion separate from the roll axis motion, and avoids unwanted control inputs in the roll direction when only pitch is being controlled, and vice versa.

As those skilled in the are will appreciate, sidesticks 10A and 10B must return to their original position once the applied force is removed. In prior art control systems, this task is accomplished with the aid of dedicated springs, dampers and other mechanical devices, which are connected to the sidesticks. While this is an adequate solution it is preferable, from both a cost and operating efficiency standpoint, to eliminate or minimize the need for such additional hardware. Since the present invention is based on the principle of fluid transfer, the use of dedicated dampers may be avoided by appropriately sizing conduits 28 or by placing fluid restrictors inside the conduits. Furthermore, the use of a metal bellows fluid displacer in the present invention provides an additional advantage in that sidesticks 10A and 10B return to their original position without the use of additional springs when the applied forces are removed.

Figure 4:
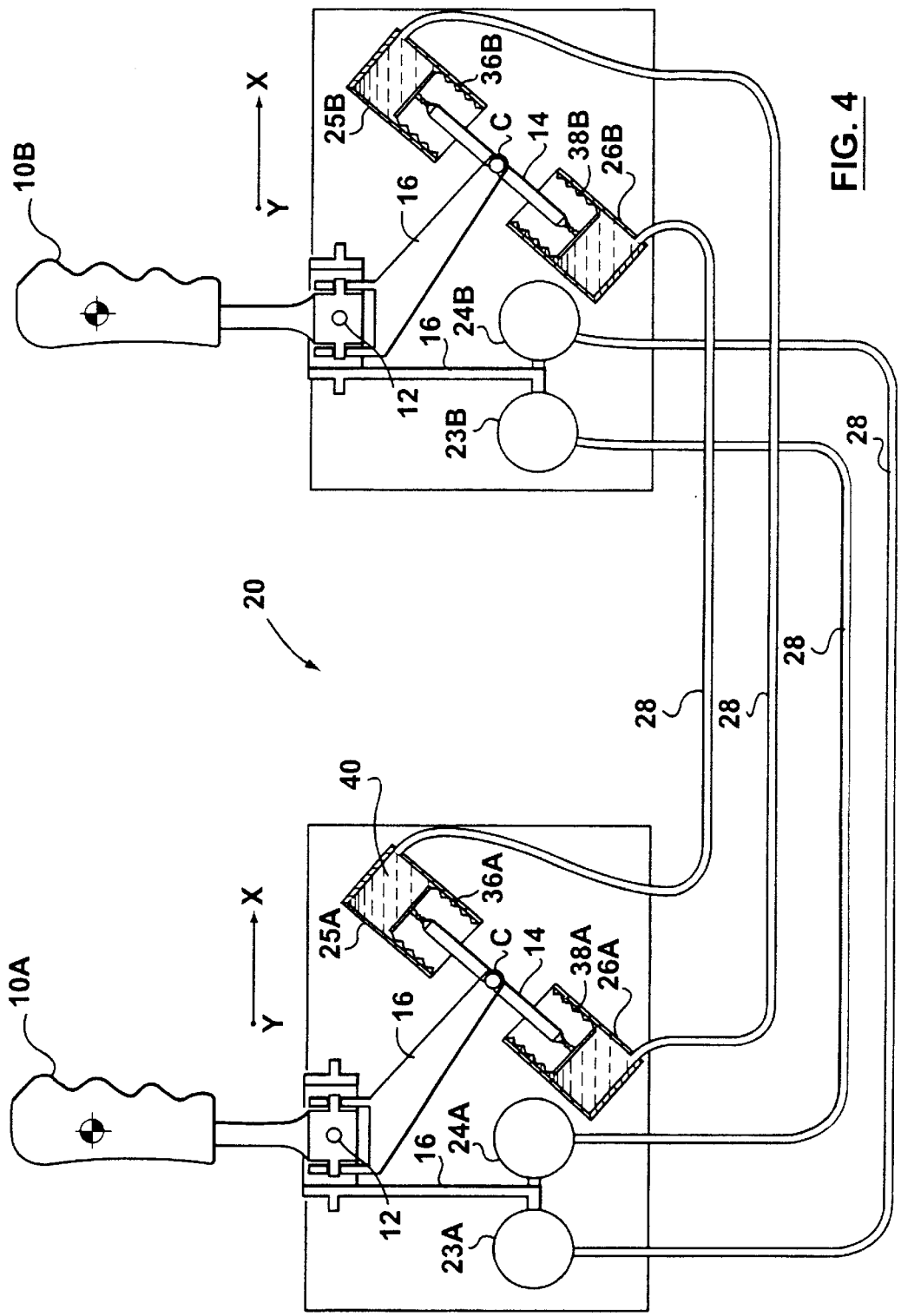
FIG. 4 is a side view of a coupling assembly according to the preferred embodiment of the present invention.

Referring now to FIG. 4, in a particularly preferred embodiment of the invention, control system 100 controls motion of the aircraft in two degrees of freedom to control aircraft pitch and roll. Again, control system 100 preferably includes a coupling assembly 20 which connects sidesticks 10A and 10B to cause them to experience substantially identical motion. In this embodiment of the invention, coupling assembly 20 includes at least one fluid displacer 32, 34, 36 and 38 mounted inside a chamber for each sidestick controller that is present in control system 100.

In the preferred embodiment of the invention, each fluid displacer 32–38 translates in both directions along the axis to which it is aligned. Thus, fluid displacers 32A and 34A located inside port chamber 23A and starboard chamber 24A associated with sidestick 10A, and fluid displacers 32B and 34B located in port chamber 23B and starboard chamber 24B associated with sidestick 10B will control roll of the aircraft by translating along the pitch axis, while the fluid displacers 36A and 38A located inside the forward chamber 25A and aft chamber 26A associated with sidestick 10A and fluid displacers 36B and 38B in forward chamber 25B and aft chamber 26B associated with sidestick 10B will control pitch of the aircraft by translating along the roll axis.

Figure 8A:
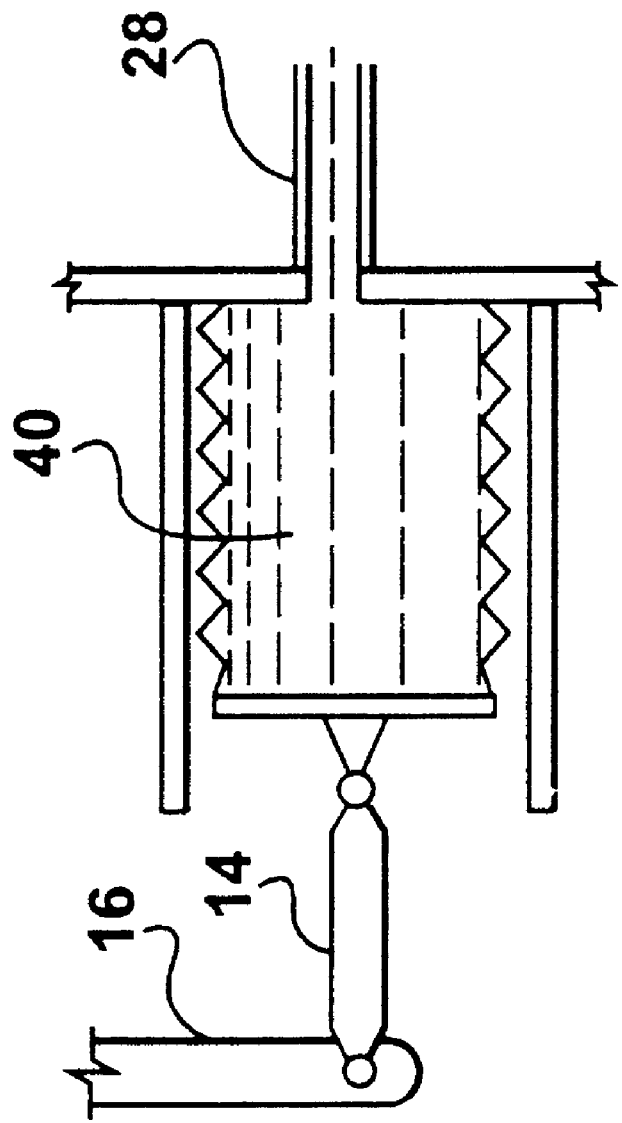
FIG. 8A is a detailed view of an embodiment of the invention that includes a bellows type fluid displacer with the fluid located inside the bellows.
Figure 8B:
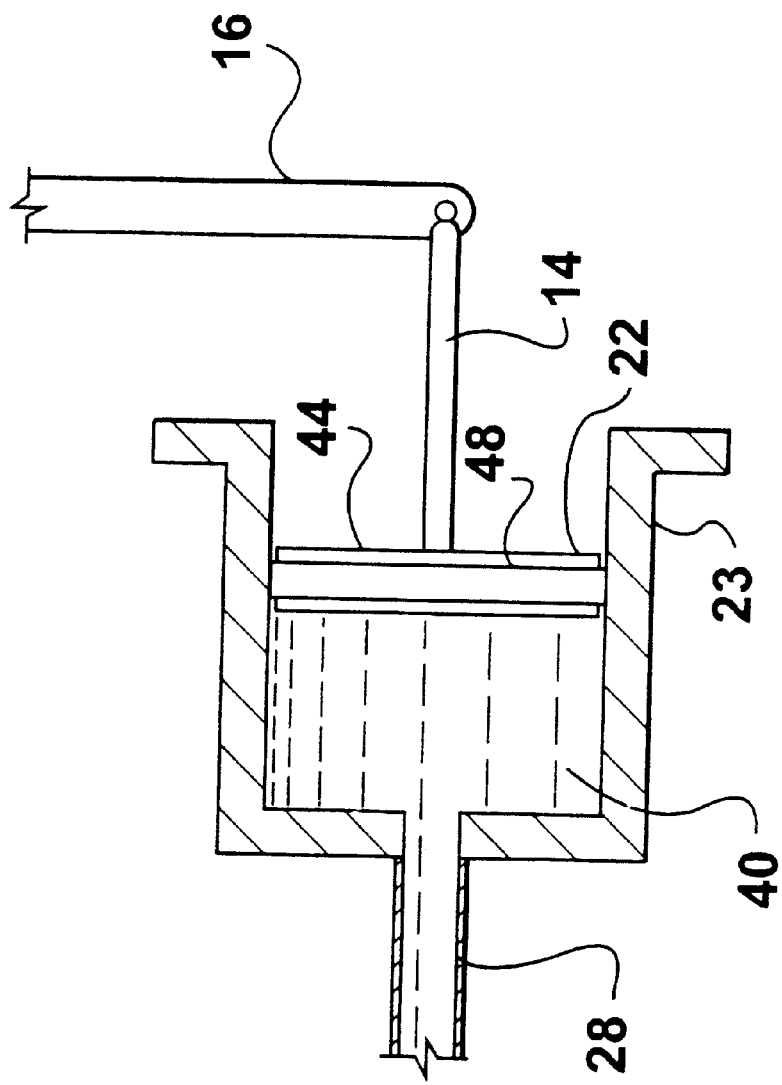
FIG. 8B is a detailed view of an embodiment of the invention that includes a piston type fluid displacer.
Figure 9:
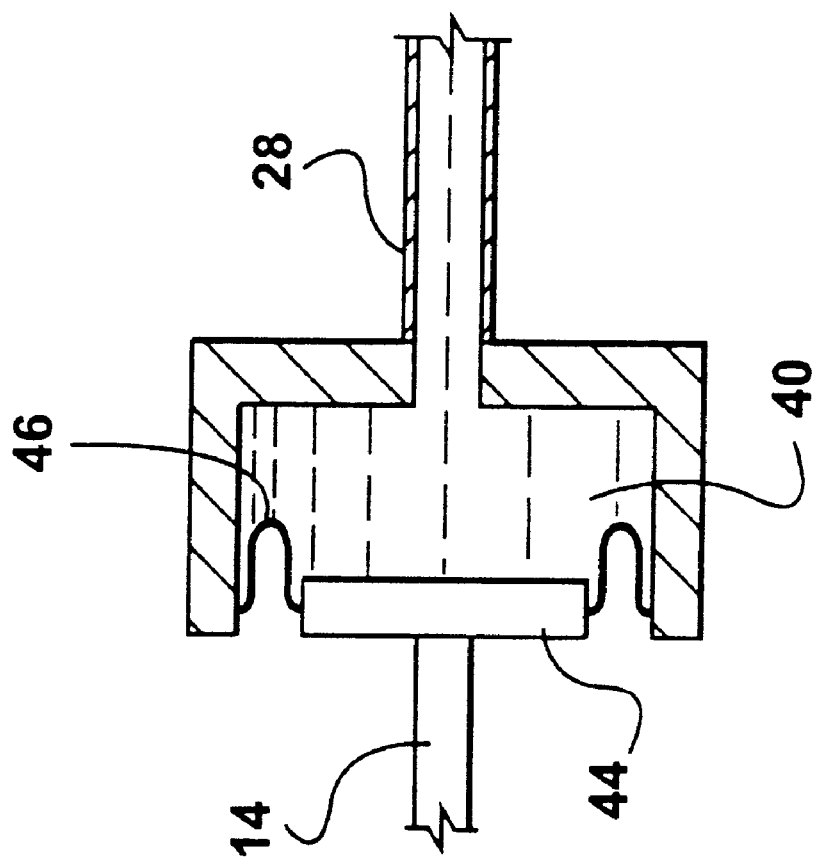
FIG. 9 is a detailed view of an embodiment of the invention that includes a piston type fluid displacer with a rolling seal.

Bi-directional translation of fluid displacers 32–38 causes fluid to be pulled into pushed out of the appropriate associated chambers as the displacer translates along the designated axis. As stated earlier, in the preferred embodiment of the invention, fluid displacers 32–38 are metal bellows 42. Bellows fluid displacers can be arranged in many ways, as shown, for example in FIG. 8A where fluid 40 is contained inside the bellows. It should be noted that in this embodiment of the invention it may be possible to eliminate chambers 23–26. In another embodiment, an example of which is provided in FIG. 8B, fluid displacers 32–38 are pistons 44. When a piston is used, it could be necessary to seal the gap between the outer circumference of the piston and the inner circumference of the chamber with an O-ring 48 or other liquid resistant seal to prevent leaks of fluid 40 as the fluid displacer translates back and forth. In one embodiment of the invention, piston fluid displacer 44 includes a rolling seal. As shown in FIG. 9, a rolling seal includes a membrane 46, which closes the gap between the outer circumference of piston 44 and the inner circumference of chamber 23–26 to prevent fluid 40 from leaking. Membrane 46 is preferably thin and flexible. This will allow for relative displacement of piston 44 inside the associated chamber even when there is very little clearance between the outer surface of piston 44 and the inside of the chamber.

It should be noted that bellows and pistons are merely examples of devices that may be used as fluid displacers 32–38. Those skilled in the art will appreciate that there are many other alternatives, and that fluid displacers may be any devices that are capable of moving fluid into and out of the chamber. As those skilled in the are will appreciate, since devices for converting translation motion into rotation and vice versa are well known, fluid displacers 32–38 could be configured to rotate about one or more axes rather than translate along them. It should be noted that most currently available sidestick controllers operate using rotation which must be converted to translation in order to control motion of the aircraft. Thus, the present invention provides a significant advantage over known devices, in that this conversion requirement is eliminated, thereby simplifying the system, and providing cost and operation efficiency.

Turning back to FIG. 4, in the preferred embodiment of the invention, four chambers and fluid displacers will be associated with each sidestick. Thus for sidestick 10A, one port chamber 23A and one starboard chamber 24A will be aligned with the pitch axis, and one forward chamber 25A and one aft chamber 26A will be aligned with the roll axis. While having two chambers associated with each axis for each sidestick is preferred, those skilled in the art will recognize that the invention could be practiced using numerous other configurations.

Figure 10:
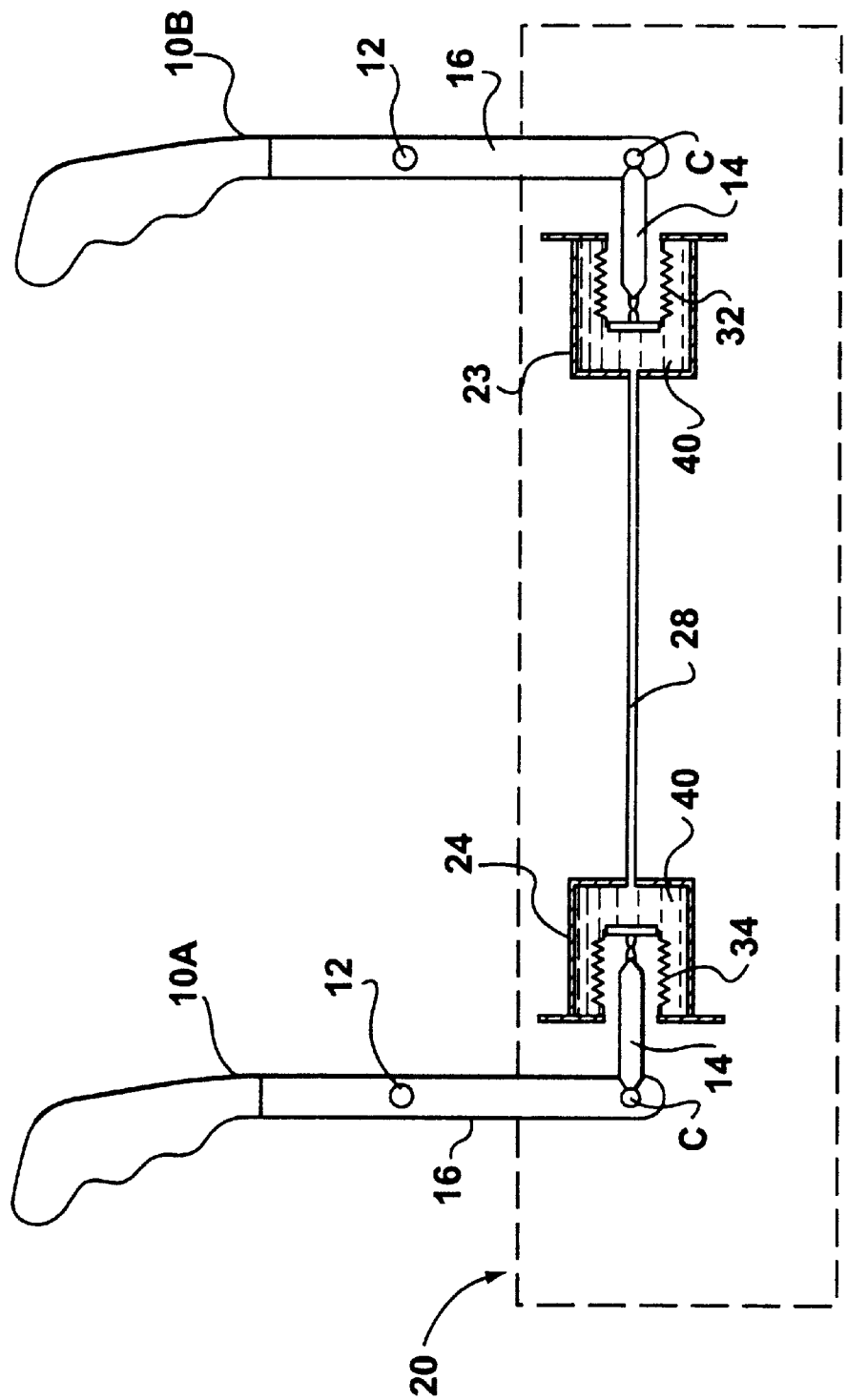
FIG. 10 illustrates an embodiment of the invention that includes one chamber associated with a single degree of freedom of each sidestick.

For example, referring to FIG. 10, the invention could also be practiced using a coupling assembly 20 that includes only one chamber for each sidestick and a single conduit connecting them for each degree of freedom of motion. In such an embodiment, pivoting sidestick 10A to the left would cause fluid displacer 34 in starboard chamber 24 to push to the right, displacing fluid 40 from the chamber, into and through conduit 28, into port chamber 23 and against fluid displacer 32. The entry of fluid 40 into port chamber 23 and against fluid displacer 32 would push fluid displacer 32 to the right and move sidestick 10B to the left to mirror the motion of sidestick 10A. Moving sidestick 10A to the right would pull fluid displacer 34 to the left and draw fluid into the chamber from port chamber 23. This would pull fluid displacer 32 to the left and cause sidestick 10B to move to the right, again mirroring the motion of sidestick 10A.

While a system such as that illustrated in FIG. 10 falls within the scope of the present invention, it should be noted that without some modification, the losses that will occur in chambers 23 and 24 and conduit 28 are likely to be greater than those that would be exhibited by the closed loop embodiment of coupling assembly 20 described with reference to FIG. 4. More specifically, while fluid 40 will preferably be substantially free of air, as a practical matter some dissolved air will usually be present. The described pulling action applied to the fluid displacers may cause a pressure drop in the fluid in the portion of the conduit that lies nearest to the chamber. This pressure drop would allow dissolved air in the fluid to come out of the solution, and form bubbles in the fluid. Repeated translations of fluid displacers 32 and 34 in the system of FIG. 10 are likely to produce a relatively large quantity of air bubbles in conduit 28, which will drastically lower the effective bulk modulus of the fluid and therefore diminish tracking accuracy. However, those skilled in the art will appreciate that compensating factors such as the use of a pressurized fluid may alleviate some of these problems.

Figure 11:
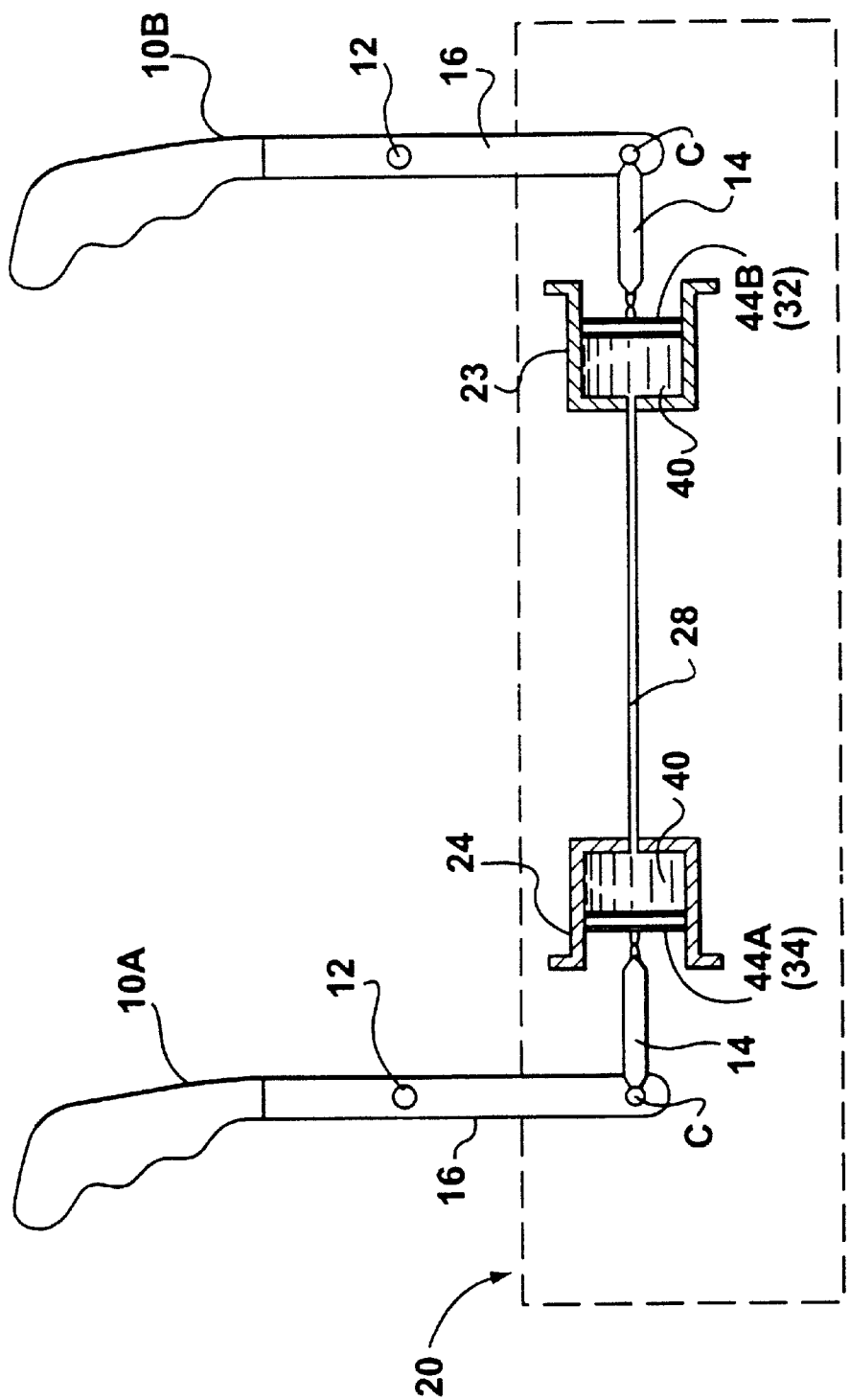
FIG. 11 is a side view of a coupling assembly that includes one chamber with a piston type fluid displacer connected to a single degree of freedom for each sidestick according to an embodiment of the invention.

Turning for a moment to FIG. 11, a coupling assembly 20 with piston type fluid displacers 32 and 34 is provided. As before, fluid displacers 32 and 34 are inside fluid containing chambers 23 and 24. The embodiment of the invention provided in FIG. 11 shows only one fluid displacer connected to each sidestick 10A and 10B for each degree of freedom, as was the case in the embodiment shown in FIG. 10. Those skilled in the art will recognize that two piston type fluid displacers could be connected to each sidestick as described in the embodiments shown with reference to FIGS. 1 and 4. Those skilled in the art will also recognize that sidesticks could be connected with a system that uses bellows type fluid displacers to control one degree of freedom, while piston or other types of fluid displacers connect another degree of freedom.

Referring again to FIG. 4, in addition to four chambers for each sidestick, the preferred embodiment of the invention also includes four conduits, each of which connects corresponding chambers for the respective sidesticks 10A and 10B. More specifically, one conduit 28 connects a chamber linked to sidestick 10A and associated with the pitch axis to a corresponding chamber linked to sidestick 10B and associated with the pitch axis. A second conduit 28 connects the other chamber linked to sidestick 10A and associated with the pitch axis to the corresponding chamber linked to sidestick 10B and associated with the pitch axis. A third conduit 28 connects a chamber linked to sidestick 10A and associated with the roll axis to a corresponding chamber linked to sidestick 10B and associated with the roll axis, while a fourth conduit 28 connects the other chamber linked to sidestick 10A and associated with the roll axis to the corresponding chamber linked to sidestick 10B and associated with that axis.

Figure 5:
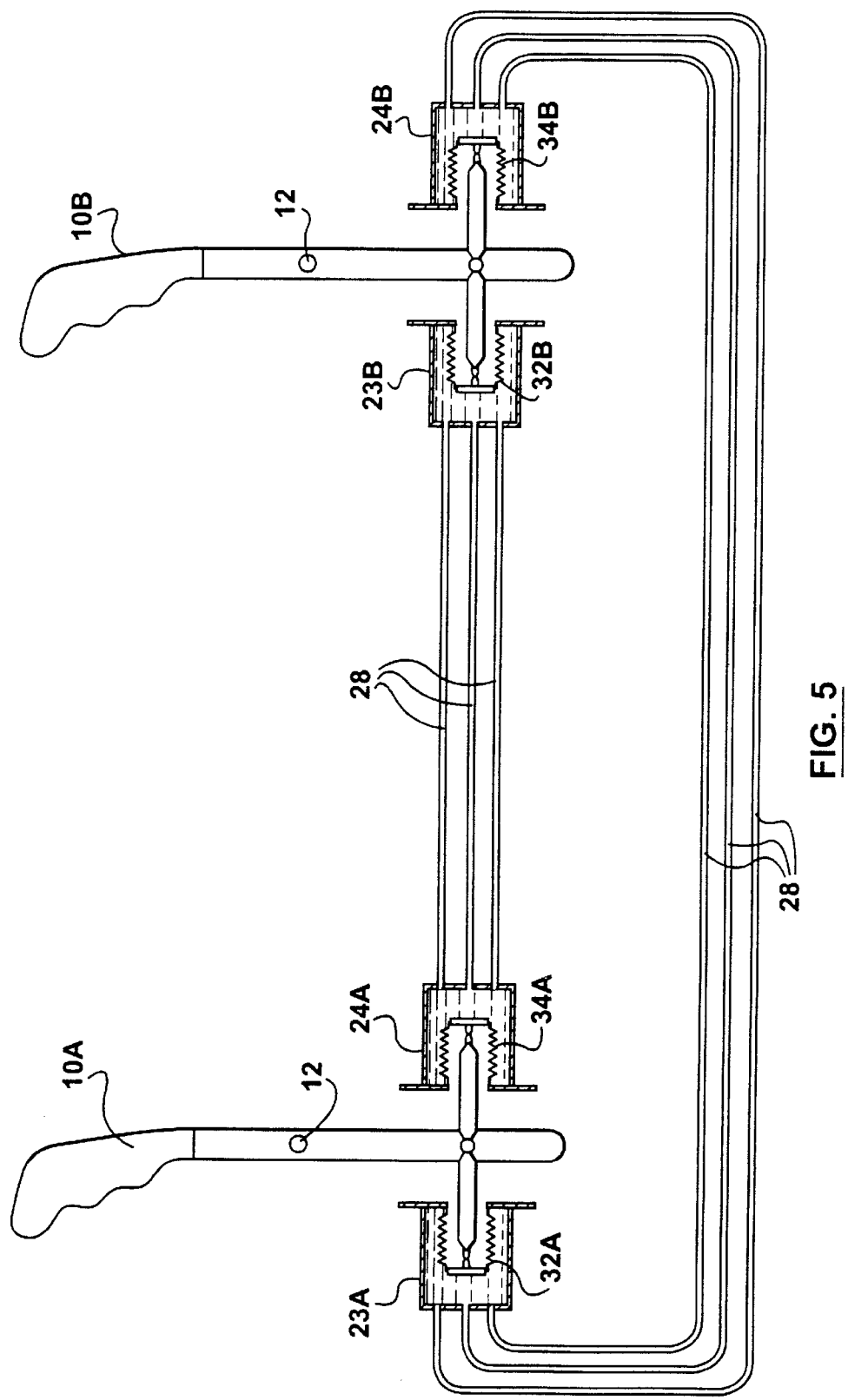
FIG. 5 is a schematic representation of an embodiment of the invention that provides multiple conduits for a single degree of freedom.
Figure 6:
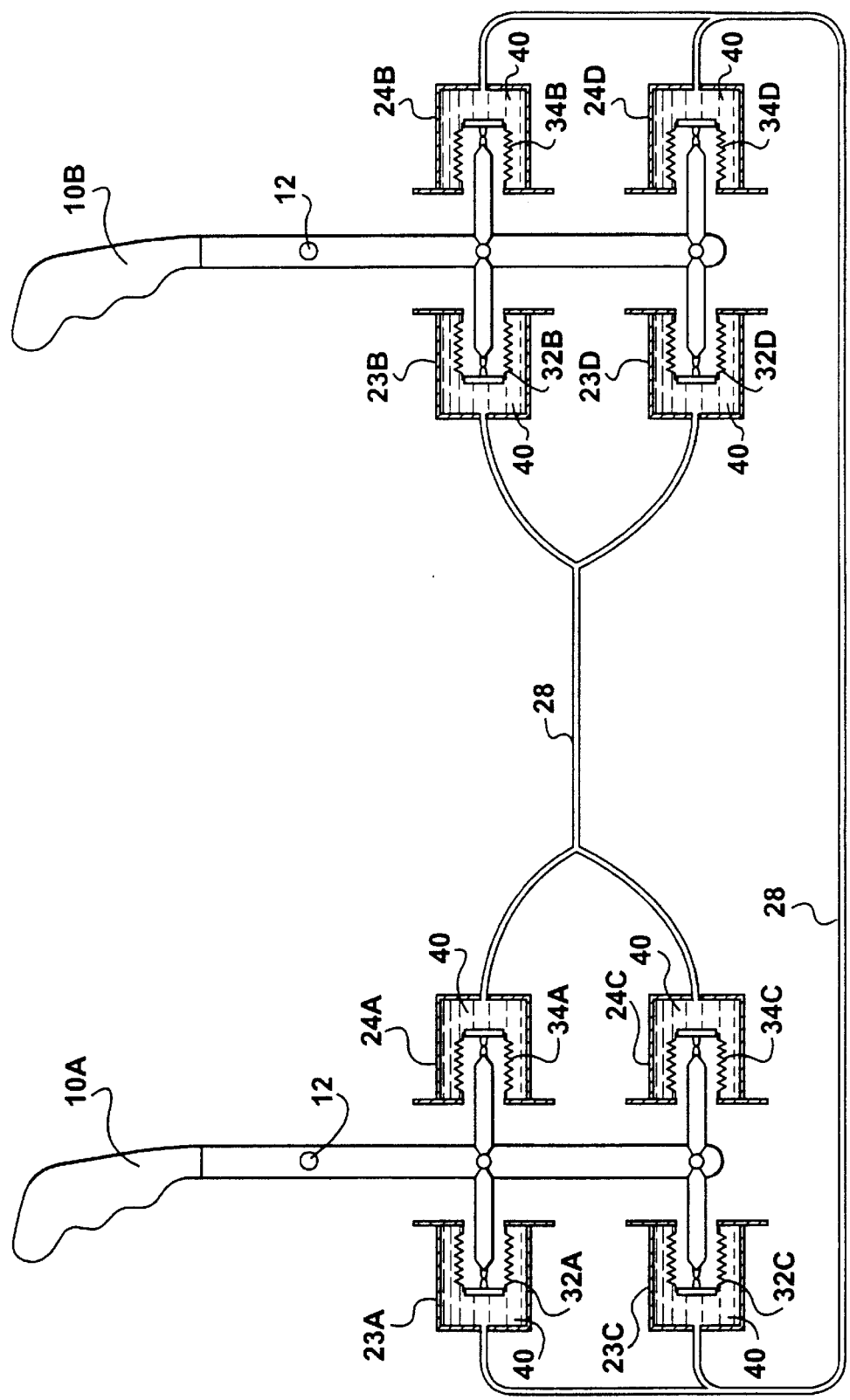
FIG. 6 is a schematic representation of an embodiment of the invention that provides multiple chambers for a single degree of freedom connected by a single conduit.
Figure 7:
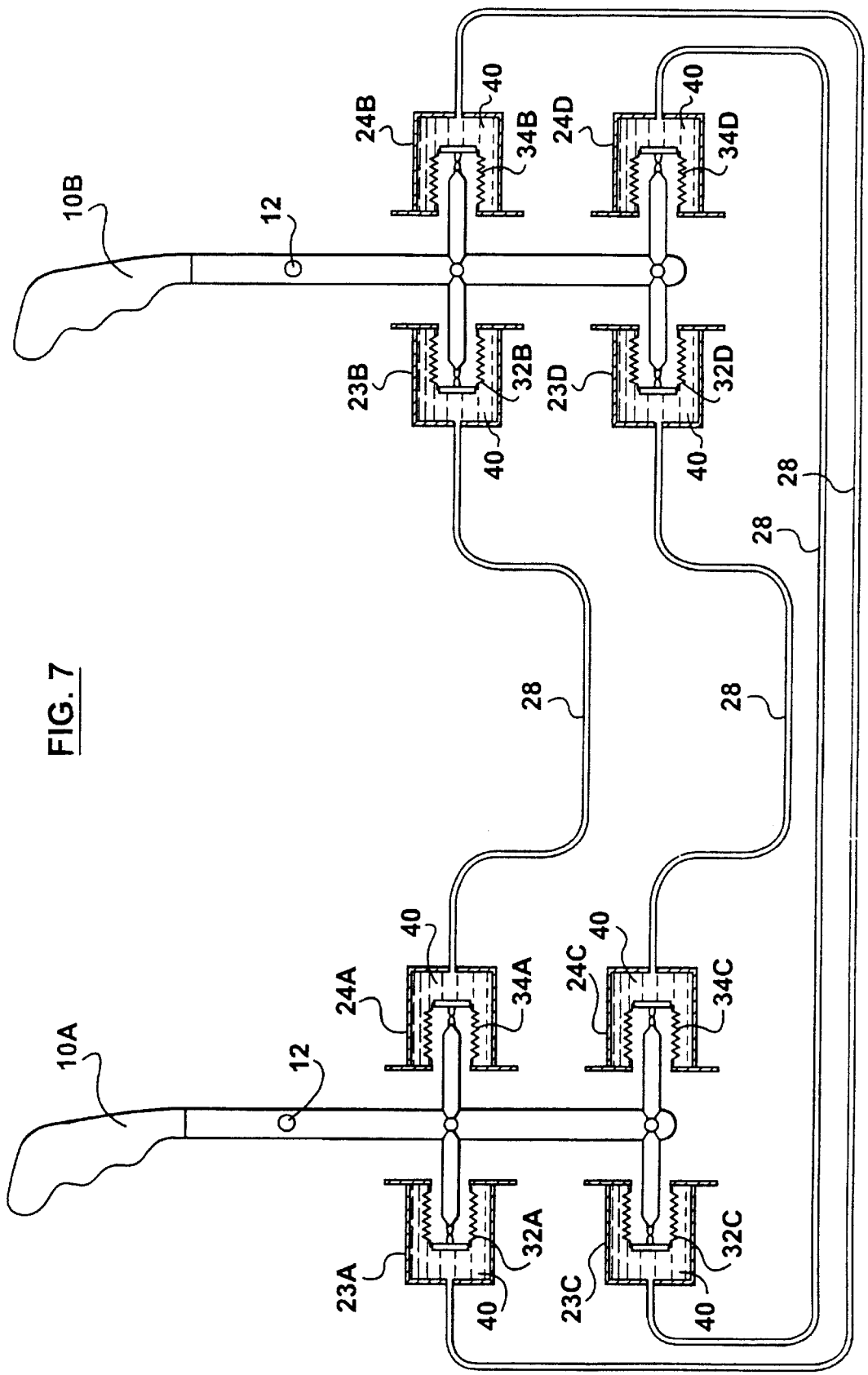
FIG. 7 is a schematic representation of an embodiment of the invention that provides multiple chambers for a single degree of freedom connected by multiple conduits.

It should be noted that while a single conduit 28 is shown connecting a pair of chambers 23 and 24, the invention is not limited to this embodiment. Turning to FIG. 5, in one embodiment of the invention, multiple conduits 28 may be used to connect a pair of chambers 23A and 24A to chambers 23B and 24B. This would allow the system to continue to operate if one conduit 28 becomes clogged. As FIGS. 6 and 7 illustrate, multiple chambers 23 and 24 could also work in parallel to control motion of the aircraft with respect to a single degree of freedom. In the embodiment illustrated in FIG. 6, one conduit 28 is provided to connect the multiple chambers 23 and 24. In the embodiment shown in FIG. 7, one conduit 28 is provided for each of the multiple pairs of chambers 23 and 24.

In accordance with the invention, fluid 40 flows back and forth between connected chambers, to synchronize the motion of the two sidesticks. As noted above, the fluid is preferably substantially free of air. Because a loss in fluid volume will result in a loss of tracking accuracy between the sidesticks, fluid 40 should also be as incompressible as possible. The viscosity of fluid 40 should also be as low as possible in order to avoid introducing undesired friction or damping forces into coupling system 100. Also, the coefficient of thermal expansion should be low, in order to maintain low pressure throughout the system across the operating temperature range, and thereby extend the life of fluid displacers 32–38.

As those skilled in the art will appreciate, the actual selection of fluid 40 is also dependent upon the desired level of system performance. Motion tracking accuracy, maximum force level and pressure, and temperature operating range must all be considered. Generally speaking, the fluid will typically have a bulk modulus higher than about 75,000 psi (about $0.5 \times 10^9$ N/m$^2$) and a viscosity below about 200 centistokes (about $2 \times 10^{-4}$ m$^2$/s). In addition, fluid 40 will preferably have a thermal expansion coefficient less than or equal to about 0.00054/° F. Silicone fluid 100 cs is one example of a fluid that has such characteristics. While values for bulk modulus, viscosity and thermal expansion are provided here, those skilled in the art will appreciate that the selection of these properties, and therefore fluid 40, will depend upon the desired dynamic characteristics of the entire system. Thus, as the conduit diameter, chamber and fluid displacer dimensions are varied, the characteristics of fluid 40 should be varied accordingly.

As stated earlier, fluid 40 is also preferably hydrostatic, which means it will remain at rest when forces are not being applied by control system 100. One benefit of using a low pressure hydrostatic fluid is that fluid 40 is less likely to spray over the pilot, co-pilot or cockpit components if coupling assembly 20 develops a leak. More importantly, a substantially constant volume of fluid can be maintained within coupling assembly 20 to provide for continued tracking accuracy between the sidesticks when a hydrostatic fluid is used. But as those skilled in the art will appreciate, the invention could be adapted for use with fluids or gases that are supplied at increased pressures, that are compressible or that are in constant or intermittent motion when the system is at rest.

Referring again to FIG. 4, conduits 28 are connected to the chambers such that fluid 40 may flow from one chamber to a connected chamber and cause the sidesticks to experience the same motion. For example in the preferred embodiment of the invention, coupling assembly 20 should connect the sidesticks so that when sidestick 10A is pivoted directly to the left along the Y axis (causing the aircraft to roll to the left without changing its pitch), sidestick 10B will also pivot directly to the left along the Y axis. Thus, in this embodiment of the invention, for port chamber 23A the "corresponding chamber associated with sidestick 10B" as discussed above will be starboard chamber 24B, and for starboard chamber 24A the corresponding chamber will be port chamber 23B. Defining the corresponding chambers therefore requires the fluid flow pattern that will cause the sidesticks to move in the same direction to be identified.

Under the circumstances described above, rotating sidestick 10A to the left directly along the Y axis causes fluid displacer 34A in chamber 24A to translate to the right along the pitch (Y) axis. This forces fluid 40 out of starboard chamber 24A, into conduit 28, and against fluid displacer 32B in port chamber 23B. Fluid displacer 32B will then translate to the right, which will cause fluid displacer 34B to move to the right, and sidestick 10B to move to the left. As fluid displacer 34B moves to the right, fluid 40 will be forced out of chamber 24B, through the attached conduit and into port chamber 23A, filling chamber 23A as fluid displacer 32A translates to the right.

Similarly, in the preferred embodiment of the invention the forward chamber associated with each sidestick should be connected to the aft chamber of the other sidestick to cause proper tracking of the two aircraft sidesticks with respect to pitch direction motion. When this is the case, pulling the pilot sidestick 10A straight back along the X axis (raising the nose of the aircraft without inducing roll) causes fluid displacers 36A and 38A in chambers 25A and 26A to translate forward along the roll axis, which forces fluid 40 out of forward chamber 25A, into and through the connected conduit 28 and into aft chamber 26B to push fluid displacer 38B forward. This means that fluid displacer 36B will move forward and sidestick 10B will move in the aft direction, mirroring the motion of sidestick 10A. As fluid displacer 36B moves forward fluid 40 will be forced out of chamber 25B and into the connected conduit to fill chamber 26A as fluid displacer 38A moves forward.

The volume of fluid that is displaced by fluid displacers 32–38 will preferably depend upon the magnitude of the forces that are applied to the associated sidestick. Thus, when a small force is applied to sidestick 10A, a small volume of fluid will be displaced to cause a small change in the aircraft motion. Similarly, when a large force is applied, a large volume of fluid will be displaced to cause a larger change in the aircraft motion. More significantly, the volume of fluid that is displaced by fluid displacers 32–38 associated with sidestick 10A controls the volume of fluid that will be displaced by sidestick 10B, and vice versa. While there are likely to be small losses in the chamber and connected conduit, the volume of fluid that is displaced by fluid displacers 32 that are associated with sidestick 10B will preferably be substantially identical to that which was displaced by the fluid displacers that are associated with sidestick 10A. Thus in the embodiment described with reference to FIG. 4, sidestick 10B will move not only in the same direction as that of sidestick 10A, but by the same amount. In this manner, the present invention causes the two sidesticks to experience substantially identical motion.

Temperatures inside the aircraft will often vary between −65° F. to 160° F. when the aircraft is not operating, and between 20° F. to 120° F. when the aircraft is operating. Significant internal pressure can result from the fluid volumetric expansion that results from such drastic temperature changes. Conduits 28 should withstand these conditions, and avoid large expansions and contractions, and should not burst under pressure. In some cases it may be necessary to add an accumulator or fluid volumetric compensator to the coupling system in order to protect the components from failure due to these extreme pressures that can develop.

Also, systems that are not equipped with an accumulator or fluid volumetric compensator should include conduits 28 that are made from a material that is flexible enough to prevent the volumetric expansion of the fluid from exceeding the maximum pressure capabilities of the conduit 28 and fluid displacers 32–38. The need to install the system beneath the cockpit floor (i.e. the need to bend conduits 28 for installation in a relatively small area) is another factor that may define their flexibility requirements. That is, conduits may have to be installed in a space that is smaller than 3 ft$^3$ (0.085 m$^3$) between the sidesticks. Conduits 28 must be able to accommodate bending during installation in a space so limited in size.

Stainless steel, aluminum and braided hose are examples of materials that meet both the compliance and flexibility requirements that must be satisfied by conduit 28, but the invention is not limited to the use of these materials. In an embodiment of the invention that includes one or more degrees of freedom that are coupled using two opposing pairs of fluid displacers to create a closed circuit, the two conduits that connect the sidestick controllers should be as identical as possible. That is, they should have identical length, cross-section, coefficient of radial expansion, total fluid volume, etc. The use of identical conduits will preserve position accuracy between the sidestick controllers when the environmental conditions such as temperature and pressure are changed.

Control system 20 can be used in a wide variety of applications, such as in controlling other vehicles that require multiple operators, in vehicles that are used for driving instruction or in other tasks for which a primary vehicle operator may require assistance, or in any other application where identical motion of independent devices is desirable. As indicated earlier, control system 100 may also be used to couple one or more sidesticks 10A or 10B to a simulator, monitor, measuring tool or other device that tracks sidestick motion. It should be noted that the embodiments of control system 100 that are described here are merely exemplary, and that the true scope and spirit of the invention should be indicated by the following claims.

Thus, it is seen that an aircraft control system that includes a coupling device having a fluid displacer that forces fluid from a first chamber, through a conduit, into a second chamber and against a second fluid displacer, in response to motion of a first sidestick, thereby causing substantially identical motion of a second sidestick, has been provided. As described above, the preferred embodiment of the invention includes a coupling assembly, which controls motion of the aircraft about at least the pitch and roll axes of the aircraft.

The invention allows the motion of each sidestick to efficiently and accurately follow that of the other. The system effectively handles pilot/co-pilot contention, has high integrity and benign failure modes. It also avoids the problems of jamming, wear, hysteresis friction and mass inertia.

One skilled in the art will appreciate that the present invention can be practiced by other than the described embodiments, which are presented for purposes of illustration and not for limitation, and the present invention is limited only by the claims which follow.

What is claimed is:

1. An apparatus for controlling the motion of an aircraft, comprising first and second pilot controllers each of which moves in the same degree of freedom, is directly operable by a pilot and is arranged to independently control motion of in aircraft about at least one axis thereof, and a coupling assembly coupling said first and second controllers to cause substantially identical and simultaneous motion of said controllers by varying a fluid distribution, wherein said coupling assembly comprises:

a first chamber including a first bellows for enabling a fluid in said first chamber to be displaced, said first bellows being coupled to said first controller;

a second chamber including a second bellows for enabling a fluid in said second chamber to be displaced, said second bellows being coupled to said second controller, and a conduit for transporting fluid between said first and second chambers in response to motion of a said bellows.

2. An apparatus as claimed in claim 1, wherein said coupling assembly further comprises a third chamber including a third bellows for enabling a fluid in said third chamber to be displaced, said third bellows being coupled to said first controller, a fourth chamber including a fourth bellows for enabling a fluid in said fourth chamber to be displaced, said fourth bellows being coupled to said second controller, and a second conduit for transporting fluid between said third and fourth chambers.

3. An apparatus as claimed in claim 2, wherein said chambers are arranged such that on moving said first controller in one direction, fluid moves from said first chamber into said second chamber and from said fourth chamber into said third chamber.

4. An apparatus as claimed in claim 3, wherein said chambers are arranged such that on moving said first controller in the opposite direction, fluid moves from said second chamber into said first chamber and from said third chamber into said fourth chamber.

5. An apparatus as claimed in claim 3, wherein said first and second conduits have substantially identical length, cross-section, co-efficient of radial expansion and total fluid volume.

6. An apparatus as claimed in claim 5, wherein said coupling assembly further comprises an accumulator for relieving fluid pressure therein.

7. An apparatus as claimed in claim 1, wherein said coupling assembly further comprises a third chamber including a fluid displacer for enabling a fluid in said third chamber to be displaced, said fluid displacer being coupled to said first controller, a fourth chamber and a further fluid displacer for enabling fluid in said fourth chamber to be displaced, said further fluid displacer being coupled to said second controller, a second conduit for transporting fluid between third and fourth chambers, said chambers being arranged such that on moving said first controller in one direction, fluid moves from said first chamber into said second chamber and from said fourth chamber into said third chamber.

8. An apparatus as claimed in claim 7, wherein said first and second conduits have substantially identical length, cross-section, co-efficient of radial expansion and total fluid volume.

9. An apparatus as claimed in claim 8, wherein the fluid in said first conduit has the same temperature co-efficient of expansion as the fluid in said second conduit.

10. An apparatus as claimed in claim 9, further comprising a valve operable from a closed position to an open position to allow fluid communication between said first conduit and said second conduit, thereby decoupling both first and second controllers from each other.

11. An apparatus as claimed in claim 1, wherein said first chamber has a first chamber wall and said first bellows has a first flexible wall, said first chamber being defined by said first flexible wall and a portion of said first chamber wall surrounding said first flexible wall, and wherein said second chamber has a second chamber wall and said second bellows has a second flexible wall, said second chamber being defined by said second flexible wall and a portion of said second chamber wall surrounding said second flexible wall.

12. An apparatus as claimed in claim 1, wherein each of said of first and second bellows has a respective flexible wall, said first and second controllers have a neutral position in the absence of an external force applied thereto, and the flexible walls of said first and second bellows have a resiliency sufficient to displace said first and second controllers towards said neutral position on removal of an applied force from said first and second controllers.

13. An apparatus as claimed in claim 2, wherein said first and third bellows each have an end connected together and arranged in tandem and said second and fourth bellows each have an end connected together and arranged in tandem.

14. An apparatus as claimed in claim 1, further comprising a plurality of conduits for transporting fluid between said first and second chambers.

15. An apparatus as claimed in claim 2, further comprising a plurality of second conduits for transporting fluid between said third and fourth chambers.

16. An apparatus as claimed in claim 1, wherein the conduit material has a coefficient or radial expansion not greater than about $1 \times 10^{-4}\%$ psi ($1.5 \times 10^{-8}\%$ m$^2$/N).

17. An apparatus as claimed in claim 1, wherein the fluid is hydrostatic.

18. An apparatus as claimed in claim 1, wherein the fluid is substantially free of air.

19. An apparatus as claimed in claim 1, wherein the fluid has bulk modulus of elasticity higher than about 75,000 psi (about $0.5 \times 10^{-9}$ N/m$^2$).

20. An apparatus as claimed in claim 1, wherein the fluid has a viscosity below about 200 centistokes (about $2 \times 10^{-4}$ m$^2$/s).

21. An apparatus as claimed in claim 1, wherein the fluid has a thermal expansion coefficient below about 0.000541/° F.

22. An apparatus for controlling the motion of an aircraft, comprising first and second pilot controllers, each of which moves in the same degree of freedom, is directly operable by a pilot and is arranged to independently control motion of an aircraft about at least one axis thereof, and a coupling assembly coupling said first and second controllers to cause substantially identical and simultaneous motion of said controllers by varying a fluid distribution, wherein said coupling assembly comprises:

a first chamber including a first fluid displacer for enabling a fluid in said first chamber to be displaced, said first fluid displacer being coupled to said first controller, a second chamber including a second fluid displacer for enabling a fluid in said second chamber to be displaced, said second fluid displacer being coupled to said second controller, a first conduit for transporting fluid between said first and second chambers in response to motion of a fluid displacer, a third chamber including a third fluid displacer for enabling a fluid in said third chamber to be displaced, said third fluid displacer being coupled to said first controller, a fourth chamber including a fourth fluid displacer for enabling a fluid in said fourth chamber to be displaced, said fourth fluid displacer being coupled to said second controller, a second conduit for transporting fluid between said third and fourth chambers, said chambers being arranged such that on movement of said first and second controllers in one direction, fluid moves out of said first and fourth chambers and into said second and third chambers, and on movement of said first and second controllers in the opposite direction, fluid moves into said first and fourth chambers and out of said second and third chambers, and a valve operable from a closed position to an open position to allow, in said open position, fluid communication between said first conduit and said second conduit, thereby decoupling both said first and second controllers from each other.

23. An apparatus for controlling the motion of an aircraft, comprising first and second pilot controllers, each of which moves in the same degree of freedom, is directly operable by a pilot and is arranged to independently control motion of an aircraft about at least one axis thereof, and a coupling assembly coupling said first and second controllers to cause substantially identical and simultaneous motion of said controllers by varying a fluid distribution, wherein said coupling assembly comprises:

a first chamber and a first bellows for enabling fluid in said first chamber to be displaced, the first chamber having a first chamber wall and the first bellows having a first flexible wall, wherein said first chamber is defined by said first flexible wall and a portion of said first chamber wall surrounding said first flexible wall, said first bellows being coupled to said first controller, a second chamber and a second bellows for enabling fluid in said second chamber to be displaced, the second chamber having a second chamber wall and said second bellows having a second flexible wall, wherein said second chamber is defined by said second flexible wall and a portion of said second chamber wall surrounding said second flexible wall, said second bellows being coupled to said second controller, and a conduit for transporting fluid between said first and second chambers in response to motion of said bellows.

24. An apparatus for controlling the motion of an aircraft, comprising first and second pilot controllers each of which moves in the same degree of freedom, is directly operable by a pilot and is arranged to independently control motion of an aircraft about at least one axis thereof, and a coupling assembly coupling said first and second controllers to cause substantially identical and simultaneous motion of said controllers by varying a fluid distribution, wherein said coupling assembly comprises:

a first chamber including a first bellows for enabling a fluid in said first chamber to be displaced, said first bellows being coupled to said first controller, a second chamber including a second bellows for enabling a fluid in said second chamber to be displaced, said second bellows being coupled to said second controller, a first conduit for transporting fluid between said first and second chambers in response to motion of a said bellows, a third chamber including a third bellows for enabling a fluid in said third chamber to be displaced, said third bellows being coupled to said first controller, a fourth chamber including a fourth bellows for enabling a fluid in said fourth chamber to be displaced, said fourth bellows being coupled to said second controller, a second conduit for transporting fluid between said first and second chambers in response to motion of a said bellows, wherein said first and second controllers have a neutral position in the absence of an external force applied thereto, and the flexible walls of said first, second, third and fourth bellows have a combined resiliency sufficient to displace said first and second controllers towards said neutral position on removal of an applied force from said first and second controllers.

25. An apparatus for controlling the motion of an aircraft, comprising first and second pilot controllers each of which moves in the same degree of freedom, is directly operable by a pilot and is arranged to independently control motion of an aircraft about at least one axis thereof, and a coupling assembly coupling said first and second controllers to cause substantially identical and simultaneous motion of said controllers by varying a fluid distribution, wherein said coupling assembly comprises:

a first chamber including a first bellows for enabling a fluid in said first chamber to be displaced, said first bellows being coupled to said first controller, a second chamber including a second bellows for enabling a fluid in said second chamber to be displaced, said second bellows being coupled to said second controller, a first conduit for transporting fluid between said first and second chambers in response to motion of a said bellows, a third chamber including a third bellows for enabling a fluid in said third chamber to be displaced, said third bellows being coupled to said first controller, a fourth chamber including a fourth bellows for enabling a fluid in said fourth chamber to be displaced, said fourth bellows being coupled to said second controller, a second conduit for transporting fluid between said first and second chambers in response to motion of a said bellows, said first and third bellows each having a fluid displacer connected together and arranged in tandem, and said second and fourth bellows each having a fluid displacer connected together and arranged in tandem such that on movement of one of said first and second controllers, the fluid displacer of said first bellows moves in the same direction as the fluid displacer of said third bellows, and the fluid displacer of said second bellows moves in the same direction as the fluid displacer of said fourth bellows.

26. An apparatus as claimed in claim 25, wherein said first and second conduits have substantially identical length, cross-section, co-efficient of radial expansion and total fluid volume.

27. An apparatus for controlling the motion of an aircraft, comprising first and second pilot controllers, each of which moves in the same degree of freedom, is directly operable by a pilot and is arranged to independently control motion of an aircraft about at least one axis thereof, and a coupling assembly coupling said first and second controllers to cause substantially identical and simultaneous motion of said controllers by varying a fluid distribution, wherein said coupling assembly comprises:

a first chamber including a first fluid displacer for enabling a fluid in said first chamber to be displaced, said first fluid displacer being coupled to said first controller, a second chamber including a second fluid displacer for enabling a fluid in said second chamber to be displaced, said second fluid displacer being coupled to said second controller, a first conduit for transporting fluid between said first and second chambers in response to motion of a fluid displacer, a third chamber including a third fluid displacer for enabling a fluid in said third chamber to be displaced, said third fluid displacer being coupled to said first controller, a fourth chamber including a fourth fluid displacer for enabling a fluid in said fourth chamber to be displaced, said fourth fluid displacer being coupled to said second controller, a second conduit for transporting fluid between said third and fourth chambers, said chambers being arranged such that on movement of said first and second controllers in one direction, fluid moves out of said first and fourth chambers and into said second and third chambers, and on movement of said first and second controllers in the opposite direction, fluid moves into said first and fourth chambers and out of said second and third chambers, and wherein said first and second conduits have substantially identical length, cross-section, co-efficient of radial expansion and total fluid volume.

28. An apparatus as claimed in claim 27, wherein the volume enclosed by said first and second chambers and the volume enclosed by said third and fourth chambers are sealed.

* * * * *